July 25, 1972  J. R. COYLE  3,679,487
THERMAL BATTERY WITH PERCUSSION CAP
Filed Feb. 19, 1969
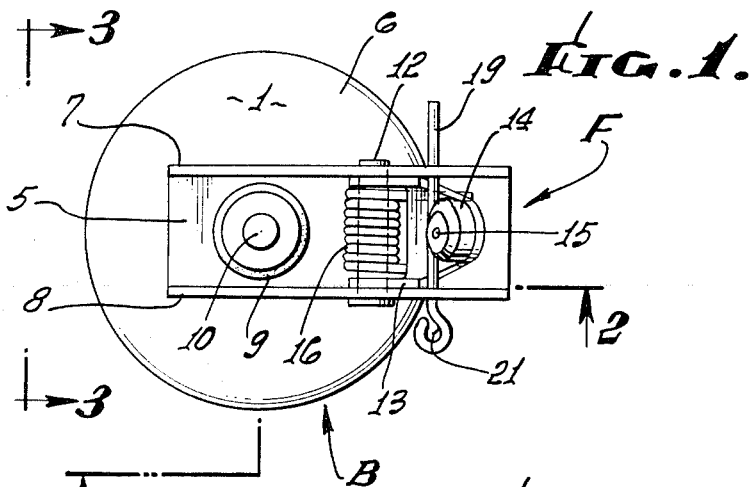
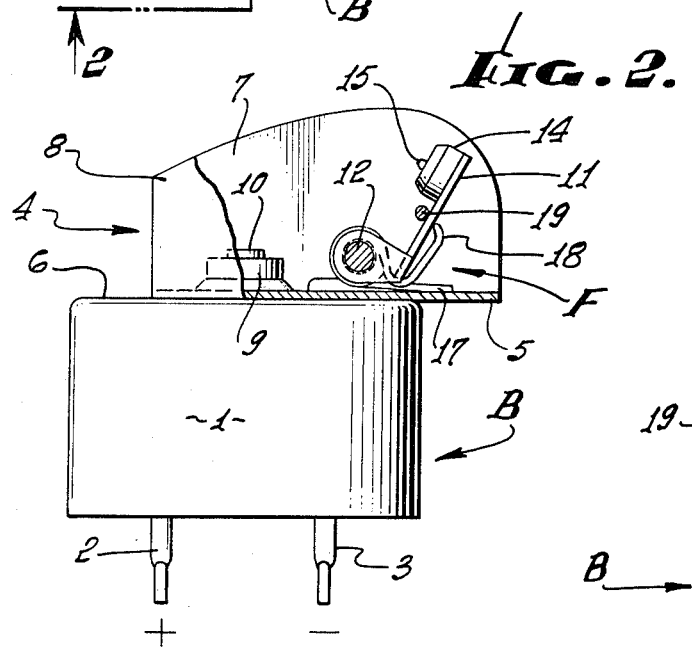
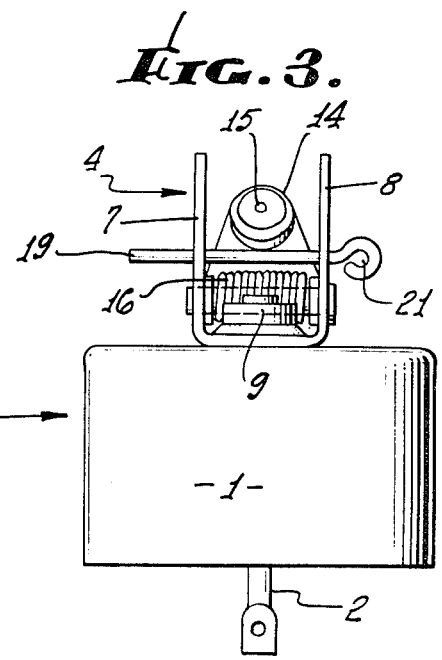
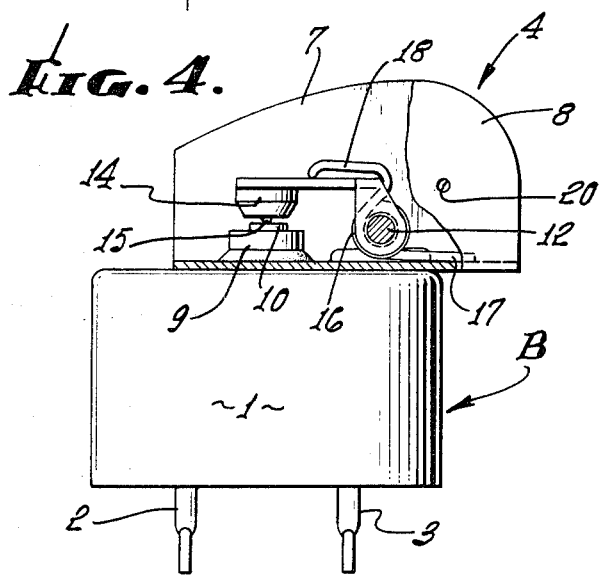
INVENTOR.
JAN R. COYLE

United States Patent Office 3,679,487
Patented July 25, 1972

3,679,487
THERMAL BATTERY WITH PERCUSSION CAP
Jan R. Coyle, 514 E. Ghent, San Dimas, Calif. 91773
Filed Feb. 19, 1969, Ser. No. 800,555
Int. Cl. H01m 17/06
U.S. Cl. 136—90
1 Claim

ABSTRACT OF THE DISCLOSURE

A thermal battery and activator in which a percussion cap is affixed to the thermal battery, and a striker is held initially in an inoperative position by a removable pin, the striker being forced toward the percussion cap by a spring when the pin is removed.

BACKGROUND OF THE INVENTION

Heretofore, thermal batteries have been provided which are adapted to produce a desired voltage output over a short period of time, in response to the reaction of various substances in an enclosed environment, resulting in the production of high heat.

Various modes of initiating the reaction have been resorted to, such as, for example, the fracturing of a partition or separator between the reactive materials. Such initiation may be accomplished by the firing of a percussion cap or detonator cap, or by other means adapted to produce a shock force of high magnitude, such as a hammer blow.

However, heretofore, there has been a need for a self-contained assemblage comprising the thermal battery and firing means therefor, so that such batteries are adapted for general utility, where a source of electricity is needed for a short period of time, and where the need for reliability is great.

SUMMARY OF THE INVENTION

The present invention provides the combination of a thermal battery with firing means, which firing means is normally rendered inactive.

More particularly, the invention provides the combination of a thermal reaction type battery and firing means therefor, wherein a percussion cap or firing element adapted to initiate the thermal reaction is associated with the battery case, a hammer or firing striker being provided to strike the percussion cap when desired, but the hammer or striker normally being held in an ineffective position by a removable pin adapted to be pulled by a lanyard.

Examples of applications of such a battery and firing means combination include the energization of various forms of life support equipment such as canopy release systems as disclosed in my co-pending application for Letters Patent of the United States filed concurrently herewith, Ser. No. 800,486, now Pat. No. 3,567,158. In addition, the battery may be combined with other equipment such as a signal generator, or other device requiring initiation and energization for a short period of time.

Other advantages and objects of the invention will be hereinafter described or will be apparent to those skilled in the art, and the novel features of the invention will be defined in the appended claim.

BRIEF DESCRIPTION OF THE DRAWINGS

FIG. 1 is a top plan view illustrating a combined thermal battery and firing means embodying the invention;

FIG. 2 is a side elevation thereof, with parts broken away;

FIG. 3 is a frontal view as embraced by the line 3—3 of FIG. 1; and

FIG. 4 is a view generally corresponding to FIG. 2, but showing the firing means in firing position.

DESCRIPTION OF THE PREFERRED EMBODIMENT

As seen in the drawings, the battery and firing means combination of the invention includes a thermal battery B and firing means F associated therewith.

The battery B comprises a case or housing 1, herein illustrated as a cylindrical body, but being of any desired shape or form. As is known by those conversant with thermal batteries, the housing 1 contains a suitable combination of materials adapted upon contact with one another to generate electricity at a desired voltage or output for a short period of time, the reaction resulting in the generation of heat, and the batteries having a period of electrical output proportional to the rate of heat dissipation. Thus, if desired, the case 1 may be suitably insulated to prevent rapid heat dissipation to prolong the period of electrical output.

The battery housing 1 has plug in or connector terminals denoted at 2 and 3 adapted for connection with a device which is to be electrically operated, such as, for example, a canopy release system used by airmen, a signal generator, or any other device requiring a source of electricity to initiate operation of the device or to sustain operation of the device for a limited period of time.

The firing means F includes a base support 4, herein shown as including a base wall 5 of rectangular shape, suitably affixed to an end wall 6 of the battery case 1, as by brazing or the like or spot welding. Extending outwardly from the base wall 5 is a pair of opposed sidewalls 7 and 8 of suitable form. Thus, the base support 4 is essentially a channel member, the base wall 5 of which is effectively united with the end wall 6 of the battery case 1, and the sidewalls 7 and 8 of which project outwardly from the end wall 6, the base wall 5 being made integral with the end wall 6 of the case 1.

Between the sidewalls 7 and 8 and affixed to the base wall 5 of the support 4 is a detonator or percussion cap 9 having a firing cap 10 at its center adapted upon being struck to initiate operation of the thermal battery B, in a well known manner, not requiring further illustration or description herein, the activation of the detonator or percussion cap causing the initiation of the reaction of the electro-generative materials contained in the battery case 1.

In order to fire the cap 10, a striker arm 11 is pivotally mounted between the sidewalls 7 and 8 on a pivot pin 12 which extends through the sidewalls 7 and 8 of the support 4. At its inner end, the striker arm 11 has ears 13 which slidably abut with the opposing sidewalls 7 and 8 to center the arm 11 between said walls 7 and 8 and which are pivotally disposed on the pin 12.

At its outer end, the arm 11 has a hammer 14, the hammer having a firing pin 15 adapted to strike the cap 10 of the detonator, responsive to pivotal movement of the striker arm 11 from the cocked position of FIGS. 1–3 to the fired position of FIG. 4.

Means are provided for biasing the arm 11 to the fired position, such means including a coiled torsion spring 16 having one end 17 extending along and engaging the base wall 5 of the support 4, the other end 18 of the spring engaging the hammer or striker arm 11 to bias the same in the direction of the arrow in FIG. 4.

In order to normally hold the striker arm 11 in a cocked position, a pin 19 extends through holes 20 in the sidewalls 7 and 8 of the support 4, bridging the gap therebetween to hold the striker arm 11 as shown in FIGS. 1–3. At one end, the pin 19 is provided with an eye 21 adapted to receive a suitable pulling device, such as a lanyard.

In the use of the battery, its terminals 2 and 3 are connected in circuit with a device to be electrically operated or charged. When energization is desired, the pin 19 is pulled allowing the striker or hammer 14, and more particularly the firing pin 15, to strike the cap 10 of the firing device or percussion cap 9. Thereupon, the shock produced will initiate the production of the electrogenerative reaction within the battery B.

While the specific details of an illustrative embodiment of the invention have been herein shown and described, changes may be made without departing from the spirit of the invention.

I claim:

1. A battery device comprising: electrogenerative thermal battery means including a case and terminals on said case for connection to a load, firing means carried by said case and operable to initiate the electro-generative process, said firing means including a percussion cap affixed to said case, and striker means shiftably supported by said case for movement with respect to said percussion cap from an inactive position to a firing position engaged with said percussion cap, said striker means having a hammer thereon engageable with said percussion cap upon movement to said firing position from said inactive position, and holding means for releasably holding said striker means in said inactive position, and including a support for said percussion cap and said striker means affixed to said case, said support having a base wall extending along a face of said case and outstanding sidewalls, said percussion cap being affixed to said base wall, said striker means including an arm, a pivot pin extending between said sidewalls and pivotally supporting said arm, said hammer being on said arm, a torsion spring disposed about said pivot pin and having an end engaged with said base wall and an end engaged with said arm to bias said hammer toward said percussion cap, and said holding means including a removable pin extending between said sidewalls between said arm and said cap to hold said arm in a cocked position.

References Cited

UNITED STATES PATENTS

| | | | |
|---|---|---|---|
| 1,530,133 | 3/1925 | Maxwell | 102—65 |
| 3,132,971 | 5/1964 | Selis et al. | 136—83 |
| 3,194,686 | 7/1965 | Jerome | 136—90 |
| 3,340,810 | 9/1967 | Di Paola | 102—70 X |
| 3,392,671 | 7/1968 | Hinzmann | 102—70 |
| 3,421,941 | 1/1969 | Osborne et al. | 136—90 X |
| 3,434,421 | 3/1969 | Berlin et al. | 102—64 |
| 3,447,970 | 6/1969 | Jones | 136—90 X |
| 3,505,959 | 4/1970 | Lohnert et al. | 102—70 |

CARL D. QUARFORTH, Primary Examiner

H. E. BEHREND, Assistant Examiner

U.S. Cl. X.R.

102—70; 136—181